April 7, 1964  G. S. MASON  3,127,768
ELECTRONIC METHOD FOR OBTAINING VELOCITY
AND PRESSURE CHARACTERISTICS OF FIREARMS
Filed Sept. 13, 1960
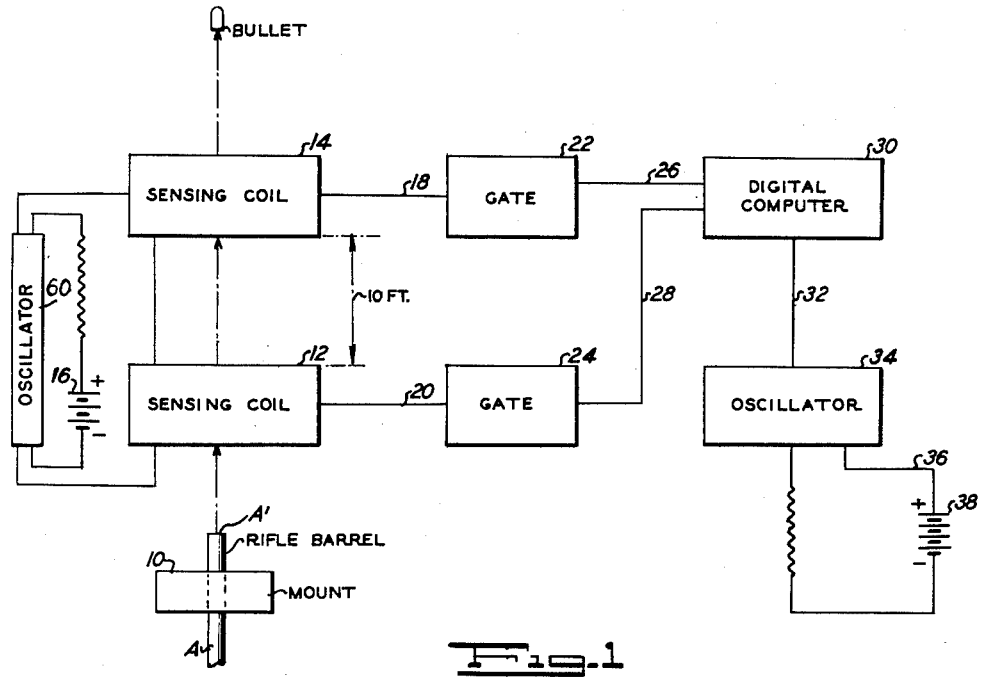
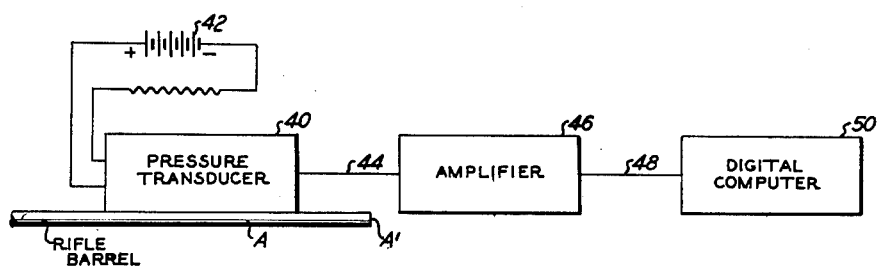
INVENTOR
GEORGE S. MASON
BY *Mason, Mason & Albright*
ATTORNEYS 3,127,768
ELECTRONIC METHOD FOR OBTAINING VELOCITY AND PRESSURE CHARACTERISTICS OF FIREARMS
George S. Mason, S. Main St. Ext., R.D. 2, Jamestown, N.Y.
Filed Sept. 13, 1960, Ser. No. 55,739
1 Claim. (Cl. 73—167)

This invention relates to a method for electronically obtaining pressure and velocity characteristics of firearms and of bullets or shells fired therefrom. In its broader sense, the invention relates to the obtaining of data including velocity and pressure characteristics of individual firearms and propellants fired therefrom, hereinafter referred to as a rifle and cartridges including bullets, respectively.

One of the principal objects of the invention is to provide for velocity tests that are reliable and accurate and which employ apparatus, the elements of which can be purchased on the open market. Such apparatus can be relied upon to obtain accurate velocity characteristics of rifles and bullets without requiring replacement of its component parts. In the present method and apparatus, the replacement of component parts, which may be said to represent prior art methods as by firing through a wire screen (which requires replacement after each firing), may be dispensed with.

Another object is the provision of a method for obtaining one reading after another in such velocity tests wherein such readings may be obtained over a short linear distance, readings being obtained without further estimating or computing.

A further object is to obtain pressure readings at the same time the velocity readings are taken whereby the simultaneous readings for pressure and velocity insure that some of the factors may be pinpointed which lead to normal or abnormal bullet flight. Again, as in the apparatus for velocity determination, the apparatus for pressure determination requires no replacement of any component part for continuous readings. Moreover, no pressure cylinders, pistons, and crushing of copper disks are required, as such methods as these of the prior art are much slower than those of the present invention and are subject to inaccuracies of readings in the practice of such prior art methods.

Other objects will appear hereinafter throughout the specification.

In the drawings:

FIGURE 1 is an electrical block diagram schematically illustrating component elements of the velocity measuring means incorporating features of the invention; and FIGURE 2 is a diagram similar to FIGURE 1, schematically illustrating component elements of the pressure measuring means incorporating features of the invention.

Referring now to FIGURE 1 of the drawings, 10 indicates a carriage for adjustably supporting a rifle barrel A, shown in broken away position. The carriage is secured to a rigid base, not shown, but of the type usually used for rigidly mounting a rifle for testing purposes. Mounted in alignment which the longitudinal axis of the barrel are a pair of sensing coils 12 and 14. By way of example, sensing coil 14 is located about 10 feet from sensing coil 12, the latter being about one foot from the rifle muzzle A', but it will be understood that these distances depend to some extent at least upon the size and caliber of the rifle under test.

A source of electrical potential is shown at 16, the same being electrically connected to oscillator 60 which in turn is connected to both sensing coils. Each sensing coil is electrically connected by wiring 18 and 20 to its gate 22 and 24, respectively. The gates are also connected by wiring 26 and 28 to a digital computer 30. The computer is connected by wiring 32 to an oscillator 34, which latter by means of wiring 36 is connected to a source of electrical potential 38.

The computer 30 is triggered by the bullet passing through the two sensing coils 12 and 14, each coil having an aperture, not shown, which apertures are in line with the rifle barrel A, whose muzzle A' may be located in the case of a rifle about one foot from the opening in the sensing coil 12. An oscillating circuit is set up in both sensing coils 12 and 14 from electrical potential source 16. A separate circuit of high frequency is set up from current source 38 and by means of oscillator 34 to the digital computer. The operating circuits are so constructed and connected to the computer that the "pips" created by the bullet passing through the sensing coils 12 and 14 will "trigger" or operate the computer 30 whereby it counts the impulses of the high frequency oscillator during the period of time necessary for the bullet to travel from sensing coil 12 to sensing coil 14. A chart can be prepared to convert the digital counter readings to velocity in feet per second.

A pressure transducer indicated in FIGURE 2 by numeral 40 receives its power from a source of electrical potential 42, by way of leads 44 from said current source 42. Leads 44 from the pressure transducer connect the transducer 40 to an amplifying means 46, and additional leads 48 connect the amplifying means 46 to a second digital computer 50.

As shown in the block diagram FIGURE 2, pressure transducer is applied to the same rifle barrel A as in FIGURE 1, preferably at a point where the pressure is greatest, namely directly over the breach chamber. When a bullet is fired in the chamber, the transducer 40 will convert the pressure of the explosion to impulses in direct proportion to the amount created by the pressure of the explosion. The output of the transducer 40 is amplified by amplifier means 46 and such amplified signals are sent to the digital computer 50 through leads 48, and the resultant readings of the computer 50 are directly related to pressure. A chart, not shown, can be used in order to convert the computer readings to pounds per square inch.

In order that all tests may be uniform and for comparison with other readings of other rifles and/or other cartridges, it is ncessary that the several barreled actions which are tested be mounted on the same carriage and the latter be secured to a rigid base. Additionally, the same type of barrel and make of firearms should be used when testing barrels of any caliber. Further, such barrels should be of the same type and grade of steel and should have the same cross-section area at the chamber. The comparison of the several types of rifles should be made under the same humidity and temperature conditions.

It will be understood that the pressure and velocity tests are conducted simultaneously in order to insure accuracy in comparisons of the several rifle actions under test.

It will be noted that the above method and apparatus for electronically simultaneously obtaining readings of velocity and pressure present the following advantages:

(1) The equipment may be purchased on the open market;

(2) One reading after another of pressure and velocity may be obtained without the replacement of any parts of the apparatus;

(3) Accurate readings may be obtained when the rifle is positioned a short linear distance, say ten feet, from the sensing coils;

(4) Velocity and pressure readings can be taken at the same time to thereby pinpoint factors in abnormal bullet flight pertaining to either velocity or pressure characteristics in a rifle under test.

The above description and drawings disclose a single embodiment of the invention, and specific language has been employed in describing the several figures. It will, nevertheless, be understood that no limitations of the scope of the invention are thereby contemplated, and that various alterations and modifications may be made such as would occur to one skilled in the art to which the invention relates.

I claim:

A method of testing a rifle to determine its velocity and pressure components that comprises the steps of mounting a rifle in a testing mount, firing the rifle and directing its bullet through the coils of at least two sensing members which have been connected to a high frequency oscillating circuit, transmitting the signal therefrom to gate means and from said gate means to a computer, applying a separate high frequency oscillating current to said computer while simultaneously obtaining an amplified signal from a pressure transducer mounted on said rifle to a second computer, whereby to obtain signals from the same rifle and the same explosion therefrom indicating velocity and pressure factors of said rifle bullet as fired from said rifle.

References Cited in the file of this patent

UNITED STATES PATENTS

| | | |
|---|---|---|
| 1,367,353 | Craig | Feb. 1, 1921 |
| 2,378,545 | Fraser et al. | June 19, 1945 |
| 2,400,189 | Carlson et al. | May 14, 1946 |
| 2,566,078 | Bliss | Aug. 28, 1951 |
| 2,959,734 | Marsh et al. | Nov. 8, 1960 |
| 2,964,939 | Forrest | Dec. 20, 1960 |
| 2,984,104 | Levine | May 16, 1961 |